Aug. 15, 1944.  W. J. FEDORCHAK  2,355,719
GAUGING AND SEAM-DETECTING APPARATUS
Filed April 3, 1943   3 Sheets-Sheet 1

Inventor
W. J. Fedorchak
By Rule and Hoge
Attorneys

Aug. 15, 1944.  W. J. FEDORCHAK  2,355,719
GAUGING AND SEAM-DETECTING APPARATUS
Filed April 3, 1943   3 Sheets-Sheet 2

Inventor
W. J. Fedorchak
By Rule and Hoge,
Attorneys

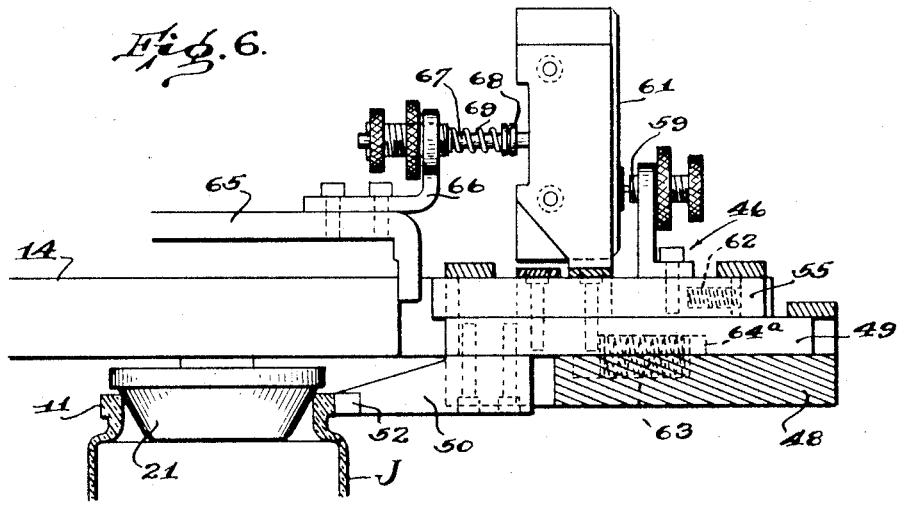
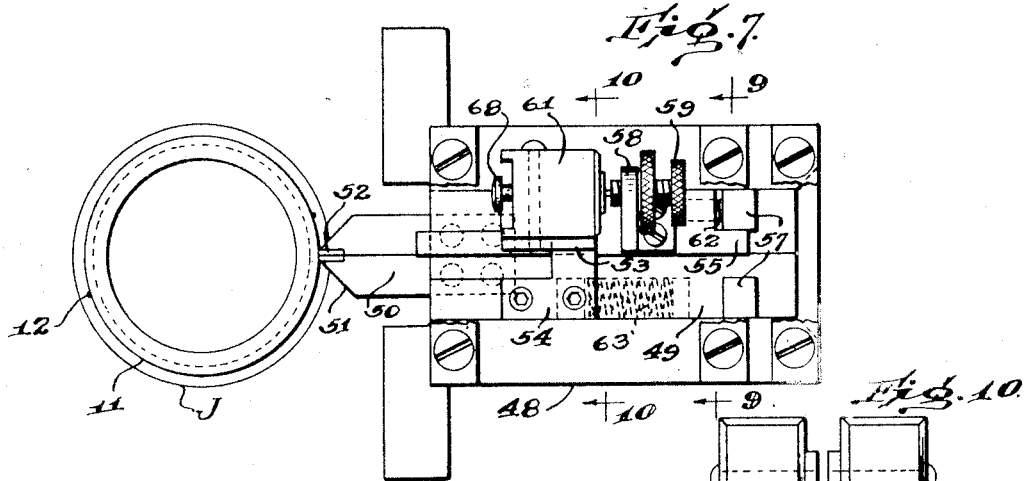
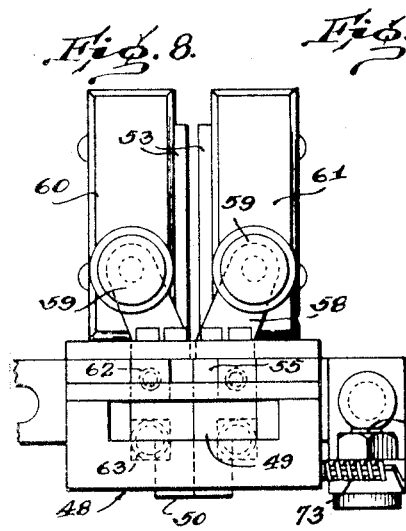
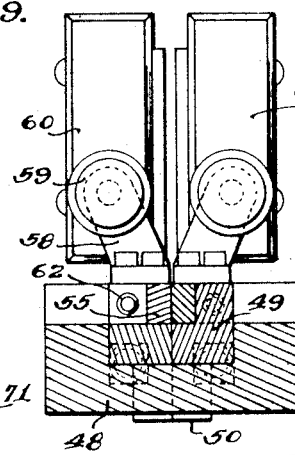
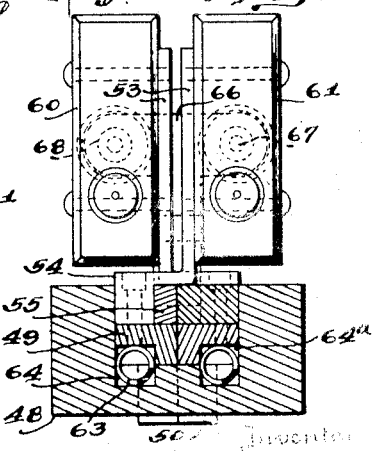

Patented Aug. 15, 1944

2,355,719

UNITED STATES PATENT OFFICE 2,355,719

GAUGING AND SEAM-DETECTING APPARATUS

William J. Fedorchak, Granite City, Ill., assignor to Owens-Illinois Glass Company, a corporation of Ohio Application April 3, 1943, Serial No. 481,706

14 Claims. (Cl. 177—311)

My invention relates to apparatus for gauging various articles and detecting seams, ridges, shoulders, and other irregularities in the surfaces of the articles. The invention in the form herein illustrated, is designed for gauging round articles such as round bottles and jars, and indicating seams or other surface irregularities, and is especially useful for gauging or testing the necks or finishes of such articles.

In the manufacture of bottles, jars, and other hollow ware, the articles are ordinarily molded in split molds. The molding operation usually results in the formation of seams or ribs at the meeting edges of the mold sections, such seams being more or less pronounced. These seams, particularly where they cross the neck or finish portion of the articles, are objectionable on account of interference with capping and sealing operations, sometimes resulting in imperfect seals and air leakage. An object of the present invention is to provide improved means for gauging such articles and detecting seams or other surface irregularities.

A further object of the invention is to provide practical mechanism for detecting any abrupt surface irregularities or changes, such as seams, shoulders and the like.

A further object of the invention is to provide detecting means for use in conjunction with gauging apparatus for gauging articles as to size, out-of-round surfaces and the like, while such detecting means operates to detect any abrupt irregularities in the surface under test.

Other objects of the invention will appear hereinafter.

Referring to the accompanying drawings:

Fig. 6 is a sectional elevation showing a gauging device in operation.

Fig. 7 is a plan view of the mechanism shown in Fig. 6.

Fig. 8 is an end elevation of the gauging mechanism.

Figs. 9 and 10 are sectional elevations at the lines 9—9 and 10—10 respectively, on Fig. 7.

The invention is herein illustrated and described as used for gauging or testing round glass jars J and particularly for testing the finishes or neck surfaces 11 to detect seams 12 (Fig. 7), shoulders 13 (Fig. 4), or other abrupt surface changes or irregularities. The invention is shown as used in conjunction with gauging apparatus of the character disclosed and claimed in Patent No. 2,327,629, granted in my name, August 24, 1943, for Gauging machines.

Figure 2:
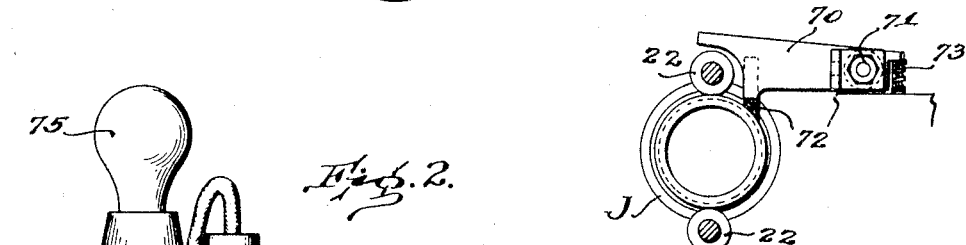
Fig. 2 is a part-sectional elevation of the same.

The gauging mechanism is carried on a platform or table 14 supported on a pair of posts 15. The work-piece J, herein illustrated as a glass jar, is placed on a pad 16 (Fig. 2) for the testing operation. The pad is mounted for rotation on a bracket 17 which may be lifted and lowered for bringing the work-piece into and out of gauging position. The pad is rotated continuously by an electric motor (not shown) operating through a gear train including a spur gear 18, pinion 19, and shaft 20. The work-piece is held centered for the gauging operation by a conical centering head or chuck 21 (Fig. 6).

Figure 1:
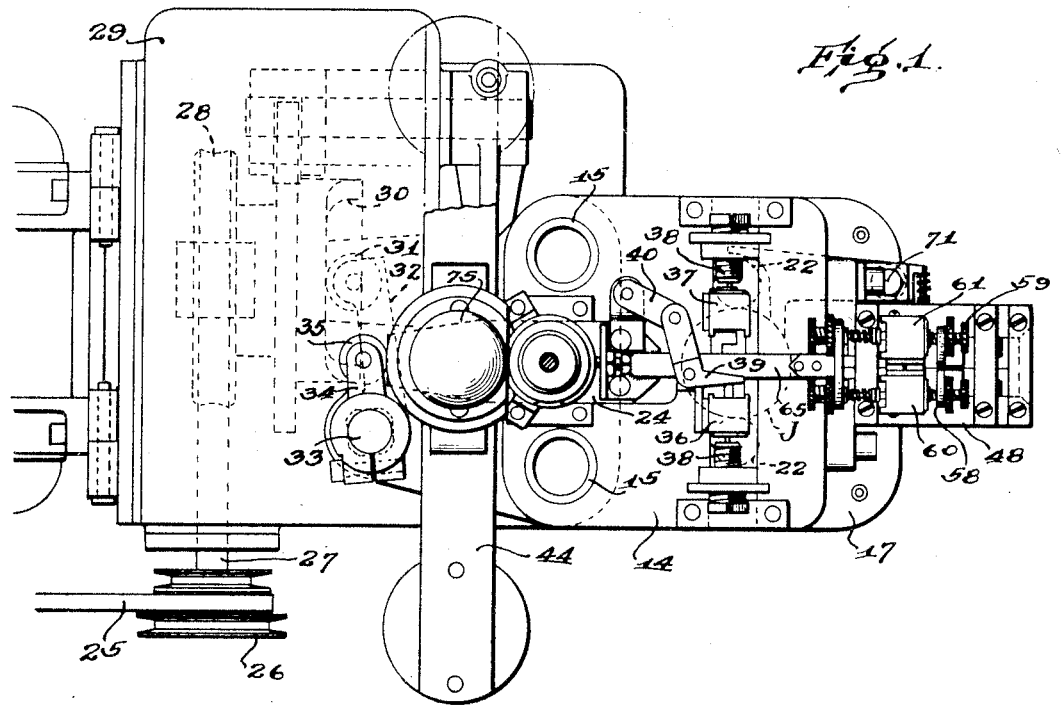
Fig. 1 is a plan view of an apparatus embodying the present invention.

Gauging means for gauging the articles as to diameter, roundness, etc., includes a pair of contact rolls 22 carried on slides 23 (Fig. 2) and movable thereby into and out of contact with the work-piece. Mechanism for operating the slides 23 includes a slide bar 24 mounted for lengthwise movement on the table 14, and operating connections (not shown) between the slide bar 24 and the slides 23. Means for actuating the slide bar 24 includes a driving belt 25 (Fig. 1) driven from the motor and rotating a pulley 26, and a worm shaft 27 which drives a worm wheel 28 within a gear casing 29. The worm wheel 28 drives a cam 30 on which runs a cam follower roll 31 carried on a rock arm 32 keyed to a rock shaft 33. A second rock arm 34 on the shaft 33 carries a roll 35 arranged to engage the end of the slide bar 24.

Micro-switches 36 and 37 are adapted to be actuated by contact pieces 38 mounted on the slides 23, the switch 37 being operated by work-pieces of undersize diameter and the switch 36 being operated by oversized work-pieces. The switch 36 is of the reset type so that it remains closed when actuated by its contact 38, independently of said contact, until reset. This serves to detect any slight enlargement, or the like, on the surface which is being gauged and which might not otherwise retain the micro-switch closed for a sufficient length of time to insure the operation of the indicating mechanism.

The switch 36 is reset after the gauging operation by means of a bell crank 39 connected through a link 40 to a bracket on the slide bar 24. When the slide bar 24 is retracted, a contact screw 41 (Fig. 2) engages a switch 42 and opens the electrical circuit for the indicating mechanism. When either of the micro-switches 36 and 37 is operated owing to a defective work-piece, a signal lamp 43 is lighted. Two signal lamps, individual to the switches 36 and 37 are preferably provided, being mounted at opposite ends of a supporting bar 44.

The mechanism thus far described may be substantially the same as that disclosed in the above mentioned patent, to which reference may be had for a more detailed description and illustration. Such mechanism serves in part for operating the gauging and detecting mechanism now to be described, comprised in the present invention. This mechanism includes a pair of gauging and detecting devices or assemblies 46 and 47 which are slidably mounted in a supporting block 48 attached to and extending outwardly from the table 14.

Figure 5:
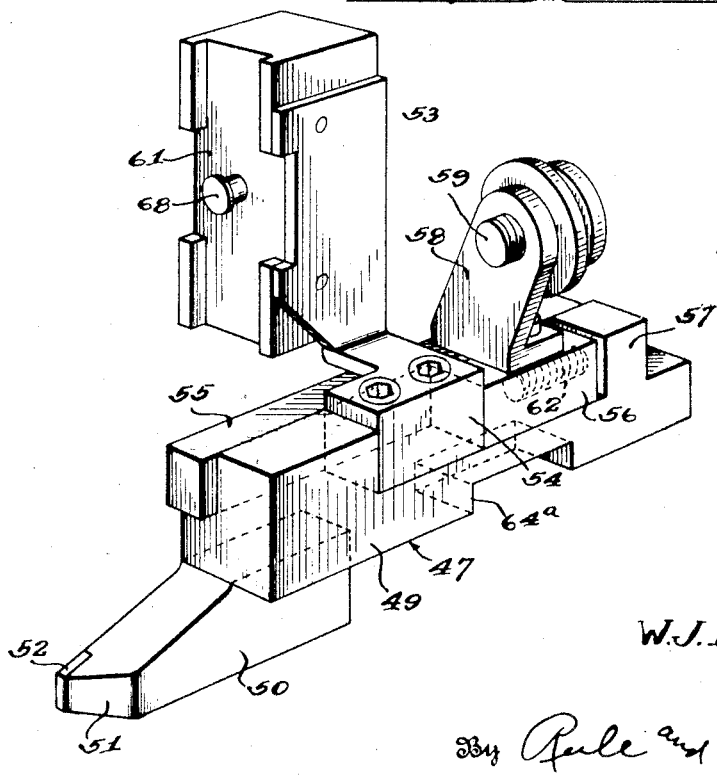
Fig. 5 is a perspective view of a gauging device.

The gauging device 47 (Fig. 5) comprises a slide block 49 having secured to its under surface a contact head 50 formed with a tapered nose 51 for engagement with the work-piece. A contact piece 52, consisting of hard metal or other suitable material resistant to abrasion, is set in the nose 51. A micro-switch 61 is mounted on the slide block 49 by means of a bracket 53 formed with a base 54 which is secured within a recess in the block 49. A slide bar 55 is mounted for a limited sliding movement on the block 49 in the direction of its length and is provided with a laterally offset portion 56 between the base 54 and a projection 57 on the block 49. A bracket 58 mounted on the extension 56 carries an adjustable contact screw 59.

The gauging device 46 is of substantially the same construction as the device 47 just described except that said devices are right and left-handed respectively and complementary to each other. The gauging device 46 carries a micro-switch 60. It will be noted that the brackets 53 (Figs. 5 and 10) carrying the micro-switches, are offset laterally in opposite directions and cross each other so that each of said micro-switches 60, 61 is positioned over the opposite slide block 49. The arrangement is such that the switch-operating contact 59 carried on the gauging unit 47, is directly behind the micro-switch 60 carried on the opposite unit 46, the corresponding switch contact on the unit 46 being positioned behind the micro-switch 61.

Each slide bar 55 (Fig. 5) is yieldingly held in its forward position by a coil compression spring 62 housed within the offset portion 56 of the slide bar, and bearing against the projection 57. The slide blocks 49 are yieldingly held in their forward position relative to the block 48 by coil springs 63 (Figs. 6-10). The block 48 is formed with recesses 64 within which the springs 63 are held under compression. Said recesses are of a depth less than the diameter of the coils so as to contain the lower halves of the springs while the upper portions are positioned within corresponding recesses 64a in the slide blocks 49.

The micro-switches 60 and 61 are of the reset type and are automatically reset after each gauging operation by means including a rod 65 attached to and extending forwardly from the slide bar 24. Attached to the rod 65 is a bracket 66 carrying a pair of contact rods 67 which register with resetting buttons 68 of the micro-switches. Each rod 67 is yieldingly held in its forward position by a coil spring 69. When the slide bar 24 is moved forward by the cam 30, as above described, the rods 67 engage the buttons 68 and reset the switches 60 and 61.

Figure 3:
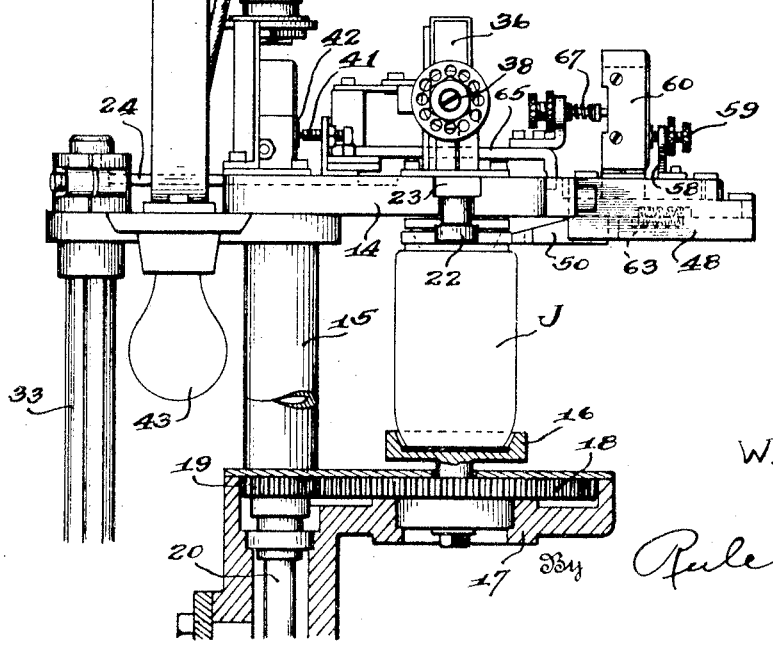
Fig. 3 is a detail view of a lubricating device.

Fig. 3 illustrates a lubricating device which may be employed for applying oil or other lubricant to the surfaces of the work-pieces on which run the gauging contacts 52. Such device includes a rock arm 70 mounted by pivot pin 71 on the platform 14. The arm 70 carries an absorbent pad 72 for the lubricant and which bears against the work-piece with a yielding pressure supplied by a spring 73.

Figure 4:
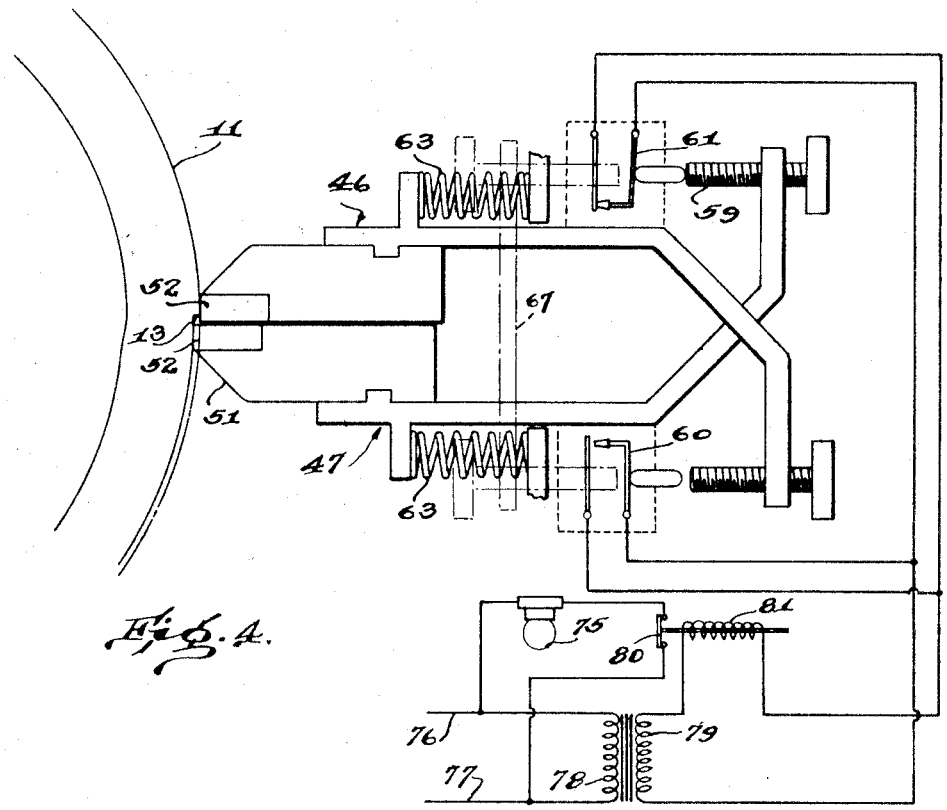
Fig. 4 is a diagrammatic plan view of the gauging mechanism together with a diagram of the electrical system.

Referring to Fig. 4, the electrical indicator system comprises a signal lamp 75 connected to receive current from the mains 76 and 77. A step-down transformer comprises a primary coil 78 connected across the mains and a secondary coil 79 of lower voltage. A switch 80 in circuit with the lamp 75 is actuated by a relay coil 81 in the secondary circuit. The micro-switches 60 and 61 are connected in circuit with the relay coil 81, the two switches being in parallel.

The operation is as follows:

A jar J to be tested is placed on the rotating pad 16 and lifted thereby to gauging position in which the jar is held centered by the centering chuck 21. The contacts 52 bear against the surface of the jar as the latter rotates, said contacts being held in line if the surface under test is smooth. Both the micro-switches 60 and 61 remain open while the contacts 52 are in line. When a seam 12 (Fig. 7), shoulder 13 (Fig. 4), or other abrupt change in the surface contour of the work-piece, is brought opposite the contacts 52, one of said contacts is forced rearwardly relative to the other as shown in Fig. 4, thereby closing one of the micro-switches. Thus as shown, the switch 61 is closed, thereby completing a circuit for the relay coil 81, which then operates to close the switch 80 so that the signal lamp 75 is lighted, indicating that the article under test is defective. After the work-piece has been rotated sufficiently to complete the test, the resetting rod 65 is moved forward automatically and resets the micro-switches 60 and 61.

Modifications may be resorted to within the spirit and scope of my invention.

I claim:

1. The combination of means for supporting a work-piece, a pair of contacts positioned side by side, means for holding said contacts against the surface of the work-piece, means for causing the pair of contacts to move over said surface, a signaling device, and means operated by a relative movement between the contacts in a direction toward or from said surface to actuate the signaling device.

2. The combination of means for supporting a work-piece, a pair of contacts positioned side by side, means for holding said contacts against the surface of the work-piece, means for causing the pair of contacts to move over said surface, a signaling device, and electro-responsive means actuated by a relative movement between said contacts to actuate the signaling device.

3. The combination of means for supporting a work-piece, a pair of contacts positioned side by side, means for holding said contacts against the surface of the work-piece, means for causing the pair of contacts to move over said surface, an electro-responsive indicating device, an electrical circuit therefor, a switch in said circuit, and means operable by a relative movement between said contacts for actuating said switch.

4. The combination of a support for an article to be tested, means for rotating said support and article, a pair of contacts positioned side by side, means for holding said contacts with a yielding pressure against a round surface of the said article while the latter is rotating, an indicating device, and means operated by a relative movement between said contacts to effect operation of the indicating device.

5. The combination of a support for an article to be tested, means for rotating said support and article, a pair of contacts positioned side by side, means for holding said contacts with a yielding pressure against a round surface of the said article while the latter is rotating, an electro-responsive signaling device, a switch in circuit with said device, and means operable by a relative movement between said contacts for actuating said switch.

6. The combination of a support for an article to be tested, means for rotating said support and article, indicating means comprising a pair of contacts positioned side by side, means for yieldingly holding said contacts in engagement with a surface of the rotating article, and electro-responsive signaling means comprising switches connected respectively to said contacts and operable by movements of the contacts relatively to each other.

7. The combination of a support for a round article to be tested, means for holding the article centered on said support, means for rotating the support and said article, a pair of contacts positioned side by side, means for holding said contacts yieldingly against the round surface of the article while the latter rotates, a signaling device, and electro-responsive means actuated by relative movement between the said contacts toward or from the axis of rotation of said article for actuating the signaling device.

8. The combination of a support for a round article to be tested, means for holding the article centered in said support, means for rotating the support and said article, a pair of contacts positioned side by side, slides on which said contacts are mounted, switches mounted respectively on said slides, and means carried by each slide operative by relative movement between the slides to actuate the switch on the other slide.

9. The combination of a support for a round article to be tested, means for holding the article centered on said support, means for rotating the support and said article, a pair of contacts positioned side by side, slides on which said contacts are mounted, switches mounted respectively on said slides, means carried by each slide operable by relative movement between said slides to actuate the switch on the other slide, and electro-responsive means in circuit with said switches for indicating relative movement of the slides.

10. Indicating means comprising slides mounted side by side, means for holding the slides with a yielding pressure against a surface to be tested, switches carried on said slides, and means on each said slide actuated by relative movement between the slides to operate the switch on the other slide.

11. Testing apparatus comprising, in combination, a device for holding an article to be tested, means for rotating said holding device and article about an axis, a pair of slides mounted for movement toward and from said axis, juxtaposed contacts carried respectively by said slides in position to contact the surface of said article, an indicating device, and means operable by a relative movement between said slides for operating said indicating device.

12. Testing apparatus comprising, in combination, a device for holding an article to be tested, means for rotating said holding device and article about an axis, a pair of slides mounted for movement toward and from said axis, juxtaposed contacts carried respectively by said slides in position to contact the surface of said article, an indicating device, a switch in circuit with the indicating device, and means operated by a relative movement between said slides to actuate said switch.

13. Testing apparatus comprising, in combination, a device for holding an article to be tested, means for rotating said holding device and article about an axis, a pair of slides mounted for movement toward and from said axis, juxtaposed contacts carried respectively by said slides in position to contact the surface of said article, switches individual to and carried by said slides, and switch-operating devices mounted on said slides and each operable by a relative movement between the slides to actuate the switch carried by the other slide.

14. Testing apparatus comprising, in combination, a device for holding an article to be tested, means for rotating said holding device and article about an axis, a pair of slides mounted for movement toward and from said axis, juxtaposed contacts carried respectively by said slides in position to contact the surface of said article, micro-switches mounted respectively on said slides, switch-operating contact devices mounted respectively on said slides each in a position to operate the switch carried by the other slide when the slides are moved relatively to each other, and electrically-operated indicating means controlled by said switches.

WILLIAM J. FEDORCHAK.